United States Patent [19]

Moulene et al.

[11] 4,319,714
[45] Mar. 16, 1982

[54] DEVICE FOR SETTING A VALVE

[75] Inventors: Jean-Louis Moulene, Elancourt; Jean-Francois Bouvot, Le Mesnil-Saint-Denis, both of France

[73] Assignee: Societe Anonyme Francaise Du Ferodo, Paris, France

[21] Appl. No.: 187,015

[22] Filed: Sep. 15, 1980

Related U.S. Application Data

[63] Continuation of Ser. No. 10,706, Feb. 9, 1979, abandoned.

[30] Foreign Application Priority Data

Feb. 17, 1978 [FR] France .................. 78 04631

[51] Int. Cl.³ ............................. G05D 23/12
[52] U.S. Cl. ..................... 236/99 G; 74/571 M; 251/234
[58] Field of Search ............ 251/60, 11, 234; 236/99 G, 86, 42; 74/571 M, 424.8 VA, 568

[56] References Cited

U.S. PATENT DOCUMENTS

| 711,295 | 10/1902 | Deare et al. ............. 251/233 X |
| 941,703 | 11/1909 | Fitts ............................. 251/233 |
| 1,264,083 | 4/1918 | Jouffret ...................... 74/568 |
| 1,345,496 | 7/1920 | Keeler ........................ 251/233 |
| 2,040,864 | 5/1936 | Mantz ......................... 251/11 X |
| 2,324,767 | 7/1943 | Cote ............................ 74/568 |
| 2,675,825 | 4/1954 | Hobbs et al. ............ 251/233 X |
| 3,205,670 | 9/1965 | Carolan ................. 137/116.5 X |
| 3,665,956 | 5/1972 | Hammon ............... 137/116.5 X |
| 4,119,118 | 10/1978 | Patel ......................... 251/57 X |

Primary Examiner—William E. Tapolcai, Jr.
Attorney, Agent, or Firm—Curtis, Morris & Safford

[57] ABSTRACT

A device for setting the closed position of a valve of the type comprising a lever having a ramp acting on a thrust member of a slidable assembly. Adjustment is effected by adjustment means comprising a cam device interposed between the thrust member and the ramp on the lever. The cam device is disposed eccentrically of its journals and it is displaced angularly from the exterior by inserting a screwdriver or the like through a hole in the body. Ratchet teeth are provided on the cam device and cooperate with pawls for retaining the desired position of the cam device when it is attained.

9 Claims, 10 Drawing Figures

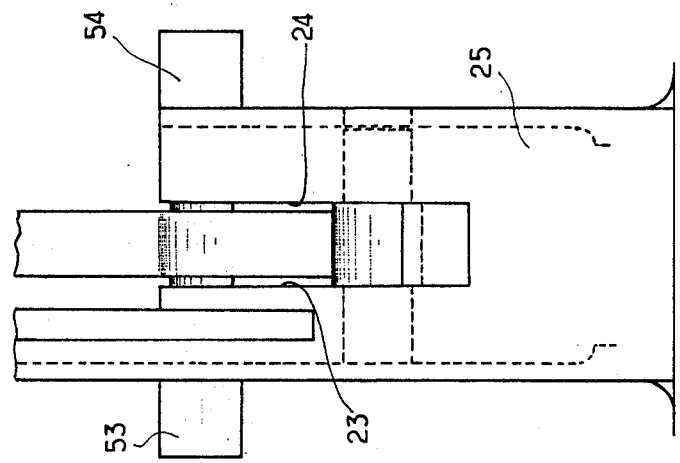
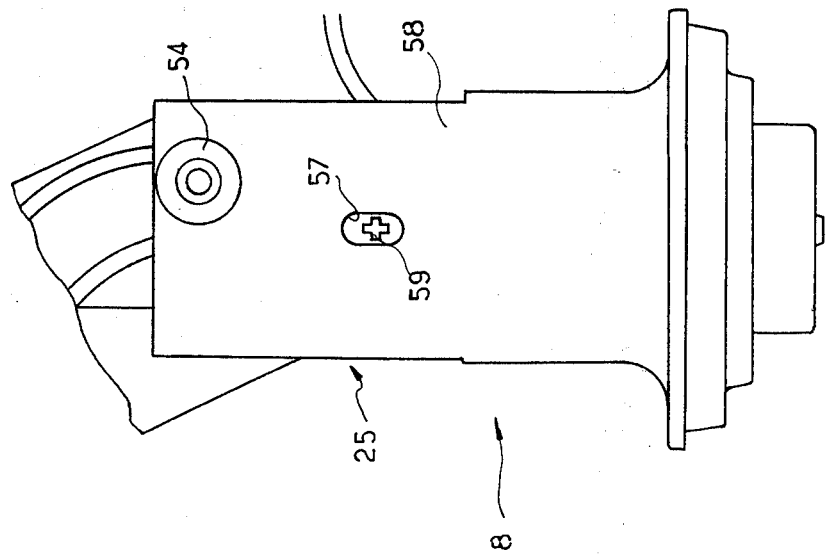

DEVICE FOR SETTING A VALVE

This is a continuation of application Ser. No. 10,706 filed Feb. 9, 1979 now abandoned.

The invention relates to devices for setting valves having an assembly slidable under the action of a lever having a ramp acting on a thrust member of the movable assembly, and more particularly to valves of this type which are used for controlling the flow of primary fluid in a heat exchanger, especially such a heat exchanger that is part of a heating and/or ventilating and/or air-conditioning system of an automotive vehicle.

In this field it is mandatory to be able to set the valve after assembly accurately through quickly and easily so that in the closed position of the valve actuating member the closure member such as a diaphragm is effectively sealingly applied against the seat defined by the orifice of the tube which it is to be sealed off and that, irrespective of the other existing conditions.

Up to the present such a setting of the valve involved manipulations or operations which were sufficiently complicated to increase the cost of manufacture excessively.

The invention obviates these drawbacks.

The adjusting device according to the invention is characterized by there being interposed, between the thrust member and the ramp on the lever, adjustment means for changing the distance between the ramp and the thrust member from the exterior.

Such a setting device which is of easy construction permits, in a simple manner, without any dismounting of the valve, the adjustment of said valve so that in the closed position of the actuating member it effectively ensures sealing contact between the closure member such as a diaphragm and its seat.

According to an embodiment, the adjustment means comprises a cradle and a cam from the sides of which protrude two aligned shafts received in notches in the cradle, at least one of the shafts being capable of being turned from the exterior so as to permit by rotation of the cam the change in the distance between the ramp and the thrust member. It is advantageous in this case that one of the shafts has seeth cooperating with a pawl on the cradle in order to fix the angular position of the cam.

In the description which follows, given by way of example, reference being made to the accompanying drawings, in which:

FIG. 7 is a partial elevational view;

FIG. 8 is also an elevational view in the direction of arrow 8 in FIG. 7;

Figure 1:
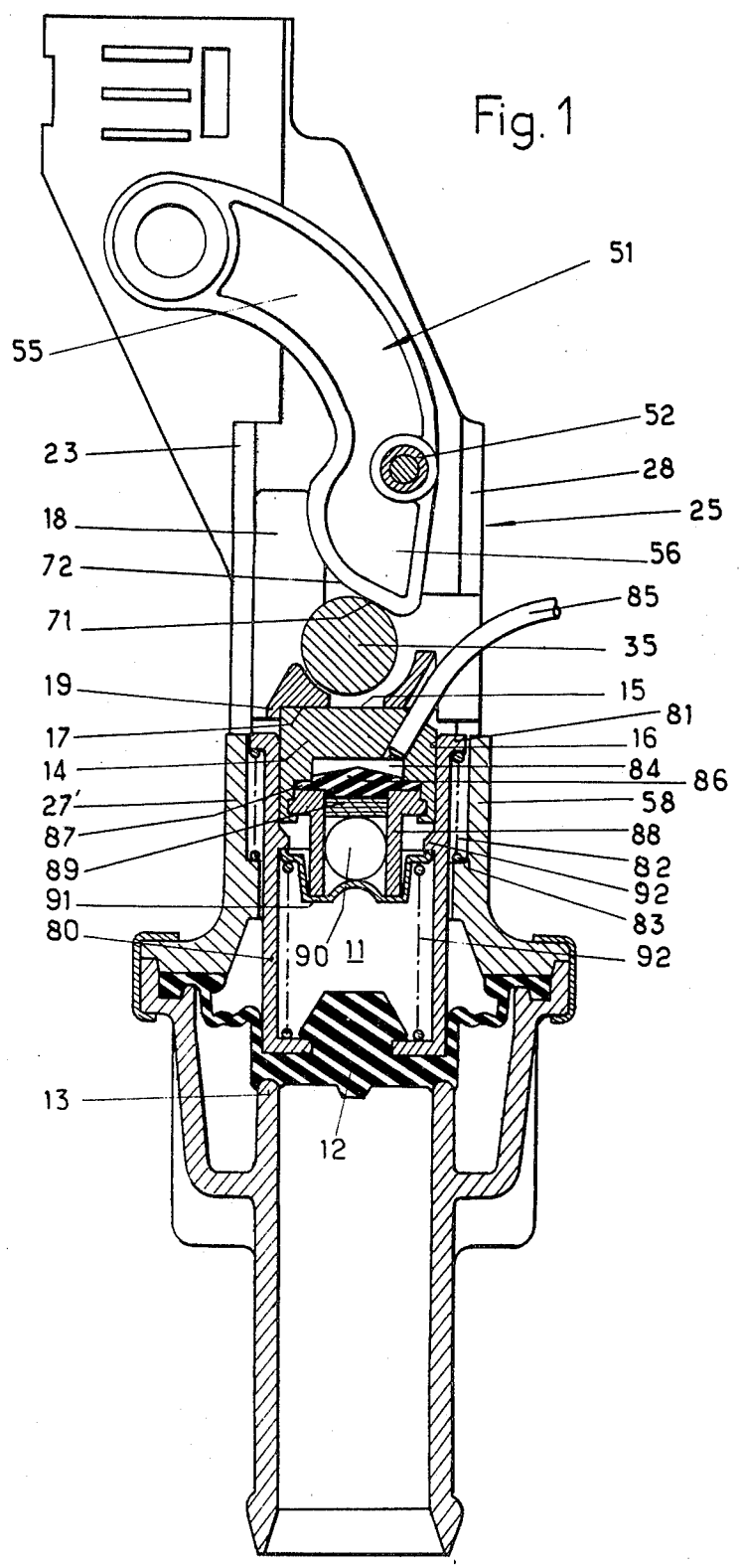
FIG. 1 is an axial sectional view of a valve comprising a setting device embodying the invention.

A sliding assembly 11 (FIG. 1) which comprises a diaphragm 12 whose closed position in cooperation with a seat 13 must be set, comprises opposite the diaphragm 12 a thrust part 14 in the form of a cylindrical cap with an upper end 15 and a cylindrical side surface 17.

Figure 4:
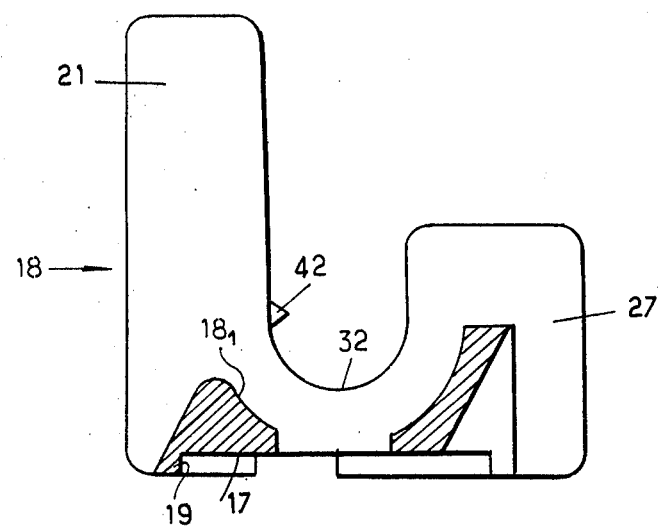
FIG. 4 is a sectional view taken on line 4—4 in FIG. 3.
Figure 2:
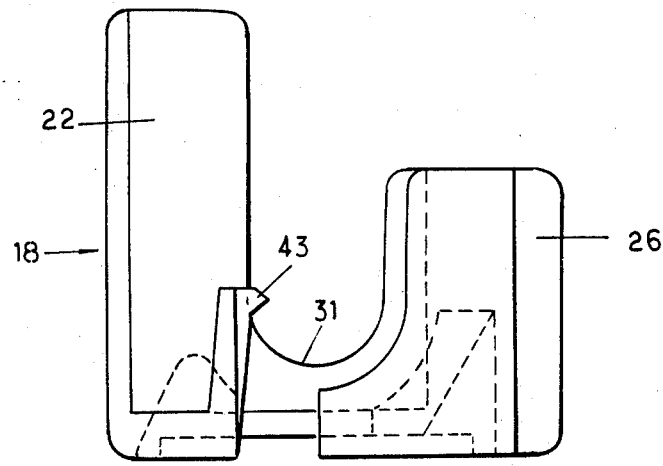
FIG. 2 is an elevational view, on an enlarged scale, of a drum or cradle which is part of the device.
Figure 3:
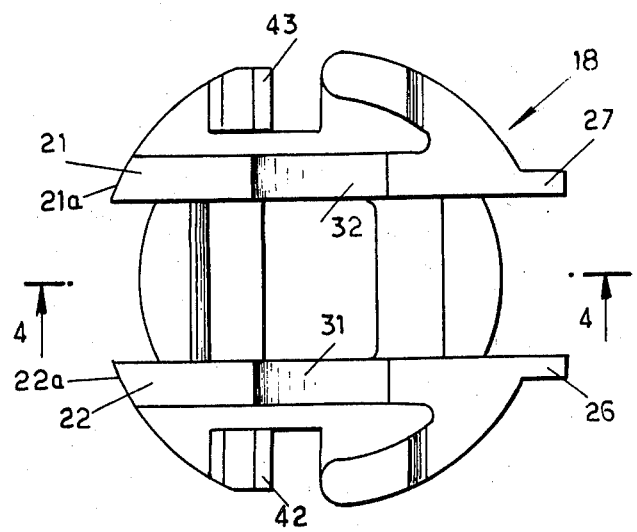
FIG. 3 is a corresponding plan view.

Against the upper end 15 rests the annular base 17 of an apertured drum 18 (FIGS. 2 to 4) rimmed by a discontinuous peripheral rib 19 which cooperates with the cylindrical surface 16 of the cap 14 for centering the drum 18. Two parallel uprights 21 and 22 are mounted on the base 17 and their edges 21a and 22a which are part of a cylinder cooperate with the inner surface, which is also cylindrical, of a "tower" 25 (FIG. 8) which is part of the valve body 27' for guiding the drum for vertical sliding movement. Also contributing to this guiding are two longitudinal lugs 26 and 27 of the drum which are opposite the uprights 21 and 22 and cooperate with the lips 28 on the tower 25 that limit an axial slot. The tower has, in a diametrically opposite position with respect to the slot, another slot whose edges form lips 23 and 24 represented in FIG. 8, in which for the sake of simplifying the drawing, the drum 18 is not shown.

Figure 5:
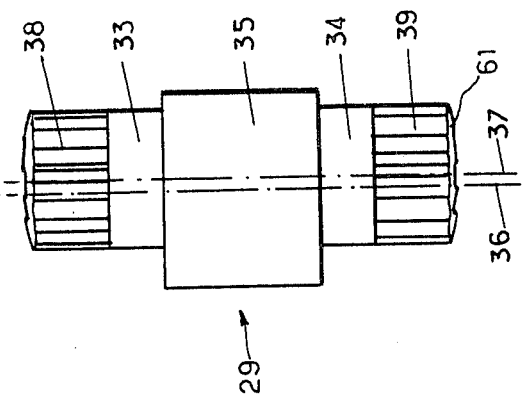
FIG. 5 is a plan view of a cam device.
Figure 6:
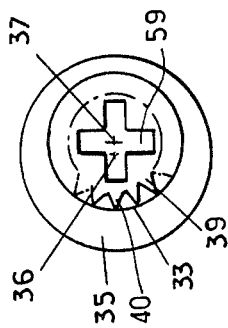
FIG. 6 is an end view of the cam device.

The drum 18 forms two semi-circular bearings 31 and 32 adapted to receive two complementary cylindrical journals 33 and 34 of a cam device 29 (FIGS. 5 and 6). The bearings flank a cam 35 of cylindrical shape whose axis 36 is offset with respect to the axis of the journals 33 and 34, which journals are continued by knobs 38 and 39 having ratchet teeth 40.

When the cam device or setting member 29—comprising the cam 35, the journals 33 and 34 and the knobs 38 and 39—bears through its journals 33 and 34 on the bearings 31 and 32 of the drum 18 the ratchet teeth 40 face pawls 42 and 43 respectively, which are integrally molded with the drum 18. When, the cam device already housed in the drum 18, the drum is introduced into the tower 25 through its open top aperture 44 (FIG. 9) the edges of the uprights 21 and 22 cooperate with the inner surface of the tower, in the vicinity of the lips 23 and 24, and the lugs 26 and 27 cooperate with the lips 28 on the tower 25.

The acutating lever 51 of the valve, mounted for rotation around a tubular shaft 52 received in bosses 53 and 54 (FIG. 8) on the tower 25, is, by urging its arm 55 opposite the one comprising the finger 56, adapted to cooperate with the cam 35 brought to its position corresponding to the closure of the valve, as shown in FIG. 1. The sliding assembly 11 is depressed by the lever 51 to its maximum in this position.

In the embodiment, the diaphragm 12 is fixed to the bottom of a cylindrical body 80 (FIG. 1) open at its top end and having an upper peripheral collar 81 whose lower end cooperates with the upper end of a coil spring 82 whose lower end bears on a ledge 83 of body 27'. The cap or thrust part 14 is accommodated partly inside the cylindrical body 80, its upper face 15 extending above the aperture of the cylindrical body.

The lower end of the cap 14 forms a chamber 84 of a thermostatic device communicating, by the intermediary of a tube 85, with a bulb containing a liquid expanding under the effect of heat, said chamber being closed off by a deformable diaphragm 86 the peripheral margin 87 of which is clamped between a rim of the cap 14 and an upper rim of a tubular guide 88. The central part of the diaphragm 86 is adapted to drive, by the intermediary of a washer 89 of TEFLON or the like, a spherical push member 90 freely slidably mounted in the lower part of the guide 88.

The lower surface of the push member 90 cooperates with a domed portion in the central part of a cup 91 having a flange serving as a support for another coil spring 92 the lower end of which is supported by the bottom of the cylindrical body 80. In the position represented in FIG. 1 the rim of the cup 91 bears against the lower side of a rim or inward projection on the cylindrical body 80.

A consequence of an increase in temperature is an increase in the volume of the chamber 84 and thereby the diaphragm exerts through the spherical push member 90, the cup 91 and spring 92 a force against the bottom of the cylindrical body which tends to urge the diaphragm 12 against its seat 13, the cap 14 being immobile and the inner surface of the cylindrical body sliding on the cylindrical surface 16.

Under these circumstances, in order to set the valve, it is preferable that the liquid contained in the hose 85 and the bulb be cold.

It is then checked whether in this condition of the bulb and in the position of the actuating lever (corresponding to the closure of the valve) the fluidtightness of the valve, that is, the application of the diaphragm 12 against the seat 13, is produced.

If this is not the case, a screwdriver is inserted through a hole 57 (FIG. 7) in the wall 58 of the tower 25. The end of the screwdriver or the like is then facing a slot 59 (e.g. cruxiform) in the front face 61 of the knob 38 or 39 opposite. It is then possible to turn the cam device 29 about the axis 37 of its journals 33 and 34. The cam 35 turns and because of its eccentricity changes the distance between, on the one hand, its point 71 of contact with the ramp 72 on the finger 56 and, on the other hand, the upper support plane 15 of the drum 18 against the cap 14. In the course of such rotation the ratchet teeth 40 pass by the pawls 42 and 43. When, by increasing this distance, which results in a displacement of the cap 14 downwards, i.e., the direction tending to move the diaphragm 12 against the seat 13, fluidtightness of the valve is achieved and the screwdriver is removed. The knobs 38 and 39 with ratchet teeth retain the position they reached by reason of the action of the pawls 42 and 43.

The valve is set.

The lever 51 is brought to its position corresponding to opening.

Figure 10:
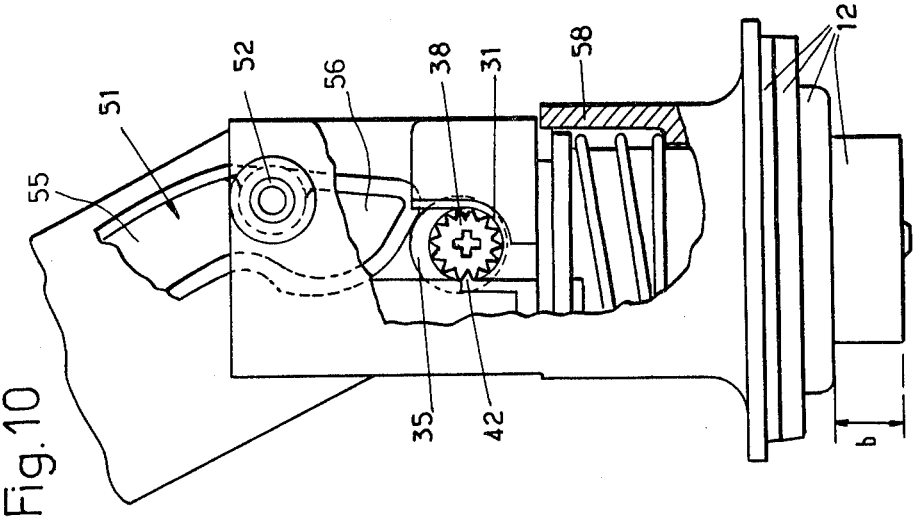
FIG. 10 is a view similar to FIG. 9 for another position of the device.
Figure 9:
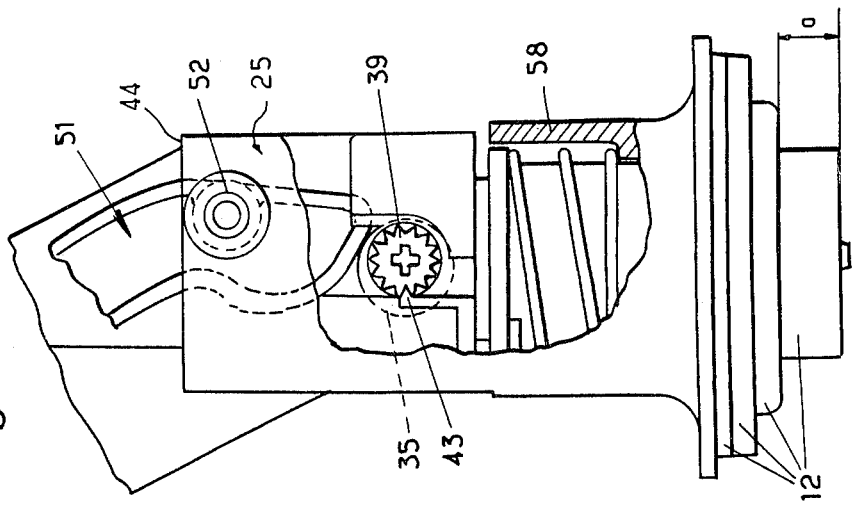
FIG. 9 is a view similar to FIG. 7 but partly cut away for a position of the setting device.

In FIG. 9 is shown a position in which the protruding part a of the movable assembly sliding with respect to the body of the valve is smaller than b which is shown in FIG. 10. This figure can therefore be considered to represent the valve after setting whereas FIG. 9 maybe considered to represent the valve before setting.

We claim:

1. A setting device for a valve slidably operating in response to a lever having a ramp acting on a thrust member, there being interposed between the thrust member and the ramp of the actuating lever a cradle and a cam from each side of which protrude two aligned shafts received in notches in the cradle, at least one of the shafts having a part which is accessible from the exterior of the device such that it is capable of being turned from the exterior so as to permit, by rotation of the cam, a change in the distance between the ramp and the thrust member.

2. A device according to claim 1, wherein at least one of the shafts has teeth adapted to cooperate with a pawl on the cradle in order to fix the angular position of the cam.

3. A valve assembly comprising:
a valve body;
a movable assembly mounted within said valve body and slidable therein, said movable assembly including a thrust member;
a valve which may be opened or closed depending upon the position of the movable assembly;
a lever having a ramp portion and arranged for moving said movable assembly when actuated;
adjustment means positioned between the thrust member and the ramp portion, said adjustment means positioned within said valve body; and
an opening within said valve body, the adjustment means being in registry therewith at least when it is actuated by the lever to a maximum closed position, said adjustment means comprising a circular cam mounted for rotation about an axis offset with respect to the axis of the cam and including a drum within said valve body, two bearings formed on the drum and flanking the cam; two journals received by said bearings, the cam being disposed eccentrically of said journal; and at least one knob connected to the journals, the knob being in registry with the opening in the valve body at least when the adjustment means is actuated by the lever to a maximum closed position and capable of rotating the cam.

4. An assembly according to claim 3 wherein the knob comprises ratchet teeth and the drum includes a pawl cooperating with the teeth.

5. An assembly according to claim 4 wherein said knob includes a slot in the face thereof capable of receiving a screwdriver.

6. An assembly according to claim 5 wherein the valve is of the thermostatic type.

7. A valve assembly comprising a valve body, and a valve slidably mounted in the body for operation in response to movement of an actuating lever having a ramp acting on a thrust member of the valve, there being interposed between the thrust member and the ramp of the actuating lever a cradle and a cam from each side of which protrude two aligned shafts received in notches in the cradle, at least one of the shafts having a part which is accessible from the exterior of the device such that it is capable of being turned from the exterior so as to permit, by rotation of the cam, a change in the distance between the ramp and the thrust member.

8. A device for setting a valve having a movable assembly carrying the closure member of the valve and being slidable under the action of a lever having a ramp acting on a thrust member of the assembly to control closure and opening of the valve, said device including adjustment means, having a part which is accessible from the exterior of the valve, interposed between the thrust member and the ramp of the lever to slide together with the thrust member under the action of the lever for changing, in the closed position of the valve and in response to adjustment of said accessible part, the distance between the ramp and the thrust member so that after adjustment of said distance at a desired value, the valve can be opened and closed at will under the action of said lever without said distance being modified, the adjustment means comprising a cam which is circular and mounted for rotation around an axis offset with respect to the axis of the cam, the valve body having a through hole formed therein, the adjustment means being in registry therewith at least when it is actuated by the control lever to its maximum closed position, said adjustment means further comprising two journals cooperating with bearings of a drum or cradel and at least one knob coaxial with the journals defining said accessible part to permit rotation of the cam with a screw-driver or the like inserted through the hole in said body, and said knob comprising ratchet teeth and the drum including a pawl cooperating with the teeth.

9. A device for setting a valve having a movable assembly carrying the closure member of the valve and being slidable under the action of a lever having a ramp acting on a thrust member of the assembly to control closure and opening of the valve, said device including adjustment means comprising a cam, a part of which is accessible from the exterior, interposed between the thrust member and the ramp of the lever, said cam being circular and mounted for rotation around an axis offset with respect to the axis of the cam to slide together with the thrust member under the action of the lever and to permit, in the closed position of the valve, under rotation by means of said accessible part, the change from the exterior of the distance between the ramp and the thrust member, so that after adjustment of said distance at a desired value, the valve can be opened and closed at will under the action of said lever without said distance being modified, the adjustments means further comprising two journals cooperating with bearings of a drum or cradle and at least one knob coaxial to the journals for rotating the cam with a screw-driver or the like inserted through a hole provided in the valve body, said cam being in registry with said hole at least when it is actuated by the control lever to its maximum closed position, and said knob comprising ratchet teeth and the drum comprising a pawl cooperating with the teeth.

* * * * *